US008327017B1

(12) United States Patent
Trost et al.

(10) Patent No.: US 8,327,017 B1
(45) Date of Patent: *Dec. 4, 2012

(54) SYSTEMS AND METHODS FOR AN AUTONOMOUS INTRANET

(75) Inventors: Christopher S. Trost, San Antonio, TX (US); Donald E. Clemons, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 206 days.

This patent is subject to a terminal disclaimer.

(21) Appl. No.: 12/046,850

(22) Filed: Mar. 12, 2008

(51) Int. Cl.
G06F 15/173 (2006.01)

(52) U.S. Cl. ......... 709/238; 709/225; 370/220; 370/235

(58) Field of Classification Search .......... 709/225, 709/238
See application file for complete search history.

(56) References Cited

U.S. PATENT DOCUMENTS

| | | | |
|---|---|---|---|
| 5,608,865 A * | 3/1997 | Midgely et al. .................. 714/1 |
| 6,148,410 A * | 11/2000 | Baskey et al. ................. 714/4.11 |
| 6,742,045 B1 * | 5/2004 | Albert et al. .................. 709/238 |
| 6,836,462 B1 * | 12/2004 | Albert et al. .................. 370/235 |
| 7,177,270 B2 | 2/2007 | Sim et al. |
| 7,210,147 B1 | 4/2007 | Hipp et al. |
| 7,269,135 B2 * | 9/2007 | Frick et al. ................... 370/228 |
| 7,272,613 B2 * | 9/2007 | Sim et al. ..................... 709/223 |
| 7,274,684 B2 * | 9/2007 | Young et al. .................. 370/352 |
| 7,430,614 B2 * | 9/2008 | Shen et al. .................... 709/245 |
| 7,443,796 B1 * | 10/2008 | Albert et al. .................. 370/235 |
| 7,490,164 B2 | 2/2009 | Srivastava |
| 7,512,702 B1 * | 3/2009 | Srivastava et al. |
| 7,587,633 B2 * | 9/2009 | Talaugon et al. ............... 714/21 |
| 7,609,619 B2 * | 10/2009 | Naseh et al. .................. 370/225 |
| 7,643,468 B1 * | 1/2010 | Arregoces et al. ............ 370/351 |
| 7,657,940 B2 * | 2/2010 | Portolani et al. ................ 726/23 |
| 7,689,722 B1 * | 3/2010 | Timms et al. ................. 709/249 |
| 7,706,304 B2 * | 4/2010 | Sinicrope et al. ............. 370/254 |
| 7,707,308 B1 * | 4/2010 | Hogge et al. ................. 709/239 |
| 7,710,865 B2 * | 5/2010 | Naseh et al. .................. 370/221 |
| 7,769,886 B2 * | 8/2010 | Naseh et al. .................. 709/238 |
| 7,810,149 B2 * | 10/2010 | Islam et al. ..................... 726/11 |
| 2001/0056503 A1 * | 12/2001 | Hibbard ........................ 709/250 |
| 2002/0141343 A1 | 10/2002 | Bays |
| 2003/0229697 A1 | 12/2003 | Borella |
| 2004/0032872 A1 | 2/2004 | Dhara |
| 2005/0198381 A1 | 9/2005 | Rorie |
| 2006/0036761 A1 * | 2/2006 | Amra et al. ................... 709/238 |
| 2006/0036892 A1 * | 2/2006 | Sunna ............................ 714/4 |
| 2006/0080441 A1 * | 4/2006 | Chen et al. ................... 709/225 |
| 2006/0092950 A1 * | 5/2006 | Arregoces et al. ........... 370/396 |
| 2006/0126619 A1 | 6/2006 | Teisberg et al. |
| 2006/0168247 A1 * | 7/2006 | Hunneyball ................. 709/228 |
| 2006/0179147 A1 * | 8/2006 | Tran et al. .................... 709/227 |

(Continued)

OTHER PUBLICATIONS

Wikipedia, Interior Gateway Protocol, pp. 1-2.*

(Continued)

*Primary Examiner* — Backhean Tiv
(74) *Attorney, Agent, or Firm* — Brooks, Cameron & Huebsch, PLLC (57) ABSTRACT

The present disclosure provides a system and method for an autonomous intranet. The autonomous intranet can include two or more data centers, each provided with a load balancer for advertising a common single-host Internet Protocol address upstream for the respective data centers under certain conditions.

21 Claims, 4 Drawing Sheets

U.S. PATENT DOCUMENTS

| | | | |
|---|---|---|---|
| 2006/0191005 A1* | 8/2006 | Muhamed et al. | 726/15 |
| 2006/0193247 A1* | 8/2006 | Naseh et al. | 370/216 |
| 2006/0193252 A1* | 8/2006 | Naseh et al. | 370/225 |
| 2006/0195607 A1* | 8/2006 | Naseh et al. | 709/238 |
| 2006/0245362 A1* | 11/2006 | Choyi | 370/238 |
| 2007/0079367 A1* | 4/2007 | Ishikawa | 726/13 |
| 2008/0270601 A1* | 10/2008 | Ishikawa | 709/224 |
| 2009/0037763 A1* | 2/2009 | Adhya et al. | 714/4 |
| 2009/0037998 A1* | 2/2009 | Adhya et al. | 726/11 |
| 2009/0201800 A1* | 8/2009 | Naseh et al. | 370/217 |
| 2011/0122844 A1* | 5/2011 | Harper et al. | 370/331 |

OTHER PUBLICATIONS

Wikipedia, Border Gateway Protocol, pp. 1-13.*

Cisco, Cisco Application Control Engine Module Getting Started Guide, Oct. 2010, pp. 1-130.*

Ballani, et al., Towards a Global IP Anycast Service, http://sigcomm.org/sigcomm2005/paper-BalFra.pdf (accessed Feb. 27, 2008).

Cisco Systems, Inc., Site-to-Site Recovery Using IGP and BGP, Mar. 2004, http://www.cisco.com/en/US/solutions/ns340/ns517/ns224/ns378/net_design_guidance0900aecd80122a78.pdf (accessed Feb. 27, 2008).

Cisco Systems, Inc., VLAN Load Balancing Between Trunks Using the Spanning-Tree Protocol Port Priority, Aug. 30, 2005, http://www.cisco.com/warp/public/473/15.pdf (accessed Feb. 27, 2008).

Cisco Systems Inc., Open Shortest Path First, Chapter 46, http://www.cisco.com/univercd/cc/td/doc/cisintwk/ito_doc/ospf.pdf (accessed Feb. 27, 2008).

Cisco Systems Inc., Reverse Route Injection, Aug. 16, 2001, http://www.cisco.com/en/US/docs/ios/12_3t/12_3t14/feature/guide/gt_rrie.html (accessed Feb. 27, 2008).

Hewlett-Packard, Route Health Injection, Chapter 17, http://www.hp.com/rnd/support/manuals/pdf/release_06628_07110/Bk2_Ch17_Route_Inject.pdf (accessed Feb. 27, 2008).

Hoch, Darren, Configuring a 2 Node Apache HA Cluster, UUASC, Jun. 2007, http://www.ufsdump.org/papers/uuasc-ha-cluster-june-2007.pdf (accessed Feb. 27, 2008).

Jalercom, S.A. DE C.V., LB-8000 Server Load Balancer, http://www.conecsion.es/DocDoc/C-LB8000-1%5B1%5D.pdf (accessed Feb. 27, 2008).

Khalidi, Youssef, Clustering Technology: Today and Tomorrow, Network World, Aug. 9, 1999, http://findarticles.com/p/articles/mi_qa3649/is_199908/ai_n8875522 (accessed Feb. 27, 2008).

Lee, Richard R., The Management of MS Cluster Server (MSCS) Computing Environments, http://www.microsoft.com/technet/archive/winntas/maintain/cluster.mspx?mfr=true (accessed Feb. 27, 2008).

Symantec Corporation, White Paper: High Availability and Disaster Recovery, http://eval.symantec.com/mktginfo/enterprise/white_papers/b-whitepaper_vcs_hadr_13584866_01_08.en-us.pdf (accessed Feb. 27, 2008).

Symantec Corporation, White Paper: Enterprise Solutions, http://www.coopseminar.com/pdf/ BusinessContinuity-SymantecIntelligentApplicationRecoverySolutionsGuide.pdf (accessed Feb. 27, 2008).

Tenereillo, Pete, Why DNS Based Global Server Load Balancing (GSLB) Doesn't Work, Part 1, Mar. 11, 2004, http://www.tenereillo.com/GSLBPageofShame.htm (accessed Feb. 27, 2008).

Tenereillo, Pete, Why DNS Based Global Server Load Balancing (GSLB) Doesn't Work, Part 2, Apr. 9, 2004, http://www.tenereillo.com/GSLBPageofShame.htm (accessed Feb. 27, 2008).

Ybarra, Paul et al., Capacity Planning Analyses of Large Data Networks: A Case Study, http://regions..cmg.org/regions/swcmg/downloads/9909Ybarra.doc (accessed Feb. 27, 2008).

Woodcock, Bill, Best Practices in IPv4 Anycast Routing, Version 0.9, Aug. 2002, http:www.pch.net/resources/papers/ipv4-anycast/ipv4-anycast.ppt#2561 (accessed Feb. 27, 2008).

* cited by examiner

SYSTEMS AND METHODS FOR AN AUTONOMOUS INTRANET

CROSS REFERENCE TO RELATED APPLICATIONS

This application is related in subject matter to, and incorporates by herein by reference in its entirety, each of the following: U.S. patent application entitled "Systems and Methods for Autonomous Intranet" bearing U.S. patent application Ser. No. 12/047,039, filed on the same date as this application; and U.S. patent application entitled "Systems and Methods for an Autonomous Intranet" bearing U.S. patent application Ser. No. 12/047,147, also filed on the same date as this application.

BACKGROUND

A data center is a facility that houses computing systems for a particular business, industry, governmental entity, or other organization. Such computing systems may include, for example, one or more server farms that perform various functions for the organization. Examples of such functions include hosting web sites, storing information, and providing processing for computing applications, among others. Other computing systems may be housed in a data center for performing other functions.

Security of information and application processing associated with a data center may be critical to particular organizations. Various efforts have been made to enhance the security of data centers. For example, some data centers are provided with physical security such as housing the data center in an inconspicuous location, providing restricted access to the data center, providing the data center with environmental isolation and control, and providing electrical power supply redundancy to the data center. Another element of security that has been added to data center design is to provide an organization with more than one physical data center, e.g., providing multiple data centers at different locations.

Providing "redundant" or "backup" data centers may provide an organization with the ability to protect data center functionality against harmful factors that extend beyond the scope of the organization's control over a single data center. For example, a single data center may be vulnerable to physical failure, e.g., from terrorist activity, fire, earthquake, etc. A single data center may be vulnerable to electronic failure, e.g., "hacker" activity such as viruses, broadcast storms, denial of service attacks, and the like. A single data center may be vulnerable to electric and/or telecommunications failure of such a magnitude that provided systems internal to the data center are unable to mitigate the failure. Other failures reducing or eliminating the functionality of a single data center are possible. In such instances, having additional data centers at separate geographic locations may provide the organization with the ability to maintain data center functionality after the loss of a single data center.

An organization may desire to provide "always-on" service from data centers such that a client using the functionality of the data centers perceives continuous service during a failover from one data center to another and during simultaneous operation of multiple active data centers. Some methods have been proposed to provide such "always-on" service to clients connecting via the Internet. For example, U.S. patent application Ser. Nos. 11/065,871 "Disaster Recovery for Active-Standby Data Center Using Route Health and BGP", Ser. No. 11/066,955 "Application Based Active-Active Data Center Network Using Route Health Injection and IGP", and Ser. No. 11/067,037 "Active-Active Data Center Using RHI, BGP, and IGP Anycast for Disaster Recovery and Load Distribution" all to Naseh et al., describe the use of border gateway protocol (BGP) and advertisement of a block of IP addresses, e.g., 24.24.24.0/24, on a subnet basis for the respective data centers.

The above mentioned efforts to enhance the security of data centers may themselves create issues. For example, a networking issue for organizations that maintain multiple active data centers is session persistence. If route maps change during a client session, e.g., due to changes in network usage causing changes in a shortest network path, traffic from one client for one session may be routed to more than one data center. For example, if two active data centers advertise the same block of IP addresses, a client may generally be routed via the shortest topographic path, using one of a number of routing metrics, to one of the data centers. However, the "shortest" path may change during the pendency of the session, e.g., as network traffic at various points throughout the network changes. In some circumstances, such changes could cause a route to a different data center to become "shorter" than the route initially taken by client traffic. This can be particularly problematic for lengthy client sessions, e.g., sessions associated with financial transactions performed over a network.

Route convergence is an example of a networking issue for organizations that maintain an active data center with a passive backup data center that may become active upon failover. When a network topology changes, e.g., due to a failure, some routers on the network may receive updated network information and use the updated information to recomputed routes and/or rebuild routing tables. On a large-scale network, e.g., the Internet, route convergence can take a significant amount of time with respect to the duration of some client sessions, possibly allowing a client to become aware of a network problem, e.g., by receiving a failure dialog on a network interface. A client may store domain name system (DNS) records locally, e.g., a cache of IP addresses corresponding to websites. Such DNS records may come with a particular time to live (TTL) that, if not expired, may prevent such DNS records from being refreshed, which may slow the route convergence process and/or allow the client to receive a failure dialog on a network interface.

SUMMARY

In one or more embodiments, an autonomous intranet system can include a first data center including a first load balancer that advertises a single-host Internet Protocol (IP) address upstream for the first data center. The autonomous intranet system can also include a second data center including a second load balancer that advertises the single-host IP address upstream for the second data center. Traffic from a client on the autonomous intranet system can be routed to one of the first and second data centers using interior gateway protocol (IGP).

According to one or more embodiments of the present disclosure, a method for operating an autonomous intranet system can include advertising a single-host IP address upstream with a first load balancer for a first data center. The method can also include advertising the single-host IP address upstream with a second load balancer for a second data center. The method can further include routing traffic from a client on the autonomous intranet system to one of the first and second data centers using IGP.

One or more embodiments of the present disclosure include a computer readable medium having instructions stored thereon, which, when executed by a processor, cause a device to perform a method, including receiving a single-host IP address advertised upstream from a first load balancer for a first data center. The method also includes receiving the single-host IP address advertised upstream from a second load balancer for a second data center. The method further includes routing traffic from a client on an intranet system to one of the first and second data centers using IGP.

In one or more embodiments, an autonomous intranet system includes a first data center having a number of servers and a first load balancer that advertises a single-host IP address upstream for the first data center. The autonomous intranet system also includes a second data center having a number of counterpart servers to the number of servers for the first data center and a second load balancer that advertises the single-host IP address upstream for the second data center. The first load balancer can perform a first health check on the number of servers and can cease to advertise the single-host IP address for the first data center when results of the first health check fail to meet certain criteria. The first and second data centers can be connected to the autonomous intranet system using IGP.

According to one or more embodiments of the present disclosure, a method for operating an autonomous intranet system includes providing a first data center with a number of servers and a first load balancer connected to the autonomous intranet system using IGP. The method also includes providing a second data center with a number of counterpart servers to the number of servers for the first data center and a second load balancer connected to the autonomous intranet system using IGP. The method further includes advertising a single-host IP address upstream with the first load balancer for the first data center and advertising the single-host IP address upstream with the second load balancer for the second data center. The method includes performing a first health check on the number of servers and ceasing to advertise the single-host IP address for the first data center when results of the health check fail to meet certain criteria.

One or more embodiments of the present disclosure include a computing device readable medium having instructions stored thereon, which, when executed by a processor, cause a device to perform a method, including advertising a single-host IP address upstream with a first load balancer for a first data center having a number of servers. The single-host IP address is the same as that advertised upstream by a second load balancer for a second data center having a number of counterpart servers to the number of servers for the first data center. The first and second data centers are connected to an autonomous intranet system using IGP. The method also includes performing a first health check on the number of servers and ceasing to advertise the single-hosp IP address for the first data center when results of the health check fail to meet certain criteria.

In one or more embodiments of the present disclosure, an autonomous intranet system includes a first data center having a number of servers and a first load balancer that receives health check information from the number of servers. The autonomous intranet system also includes a second data center having a number of counterpart servers to the number of servers for the first data center and a second load balancer. The first load balancer advertises a single-host IP address upstream and to the second load balancer based on received health check information from the number of servers. The second load balancer advertises the single-host IP address upstream for the second data center when the second load balancer ceases to receive the advertised single-host IP address from the first load balancer.

According to one or more embodiments of the present disclosure, a method for operating an autonomous intranet system includes receiving health check information from a number of servers in a first data center with a first load balancer. The method also includes advertising, with the first load balancer, a single-host IP address for the first data center upstream and to a second load balancer based on the received health check information. The method further includes advertising the single-host IP address upstream with the second load balancer for a second data center having a number of counterpart servers to the number of servers for the first data center when the second load balancer ceases receiving the advertised single-host IP address from the first load balancer.

One or more embodiments of the present disclosure include a computing device readable medium having instructions stored thereon, which, when executed by a processor, cause a device to perform a method, including receiving a single-host IP address advertised upstream from a first load balancer for a first data center based on received health check information from a number of servers in the first data center. The method also includes receiving the single-host IP address advertised upstream from a second load balancer for a second data center, having a number of counterpart servers to the number of servers in the first data center, when the second load balancer ceases receiving the advertised single-host IP address from the first load balancer.

DETAILED DESCRIPTION

The present disclosure provides a system and method for an autonomous intranet. The autonomous intranet can include two or more data centers, each provided with a load balancer for advertising a common single-host Internet Protocol address upstream for the respective data centers under certain conditions.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element in the drawing. Similar elements between different figures may be identified by the use of similar digits. For example, 102 may reference element "102" in FIG. 1, and a similar element may be referenced as 202 in FIG. 2.

Figure 1:
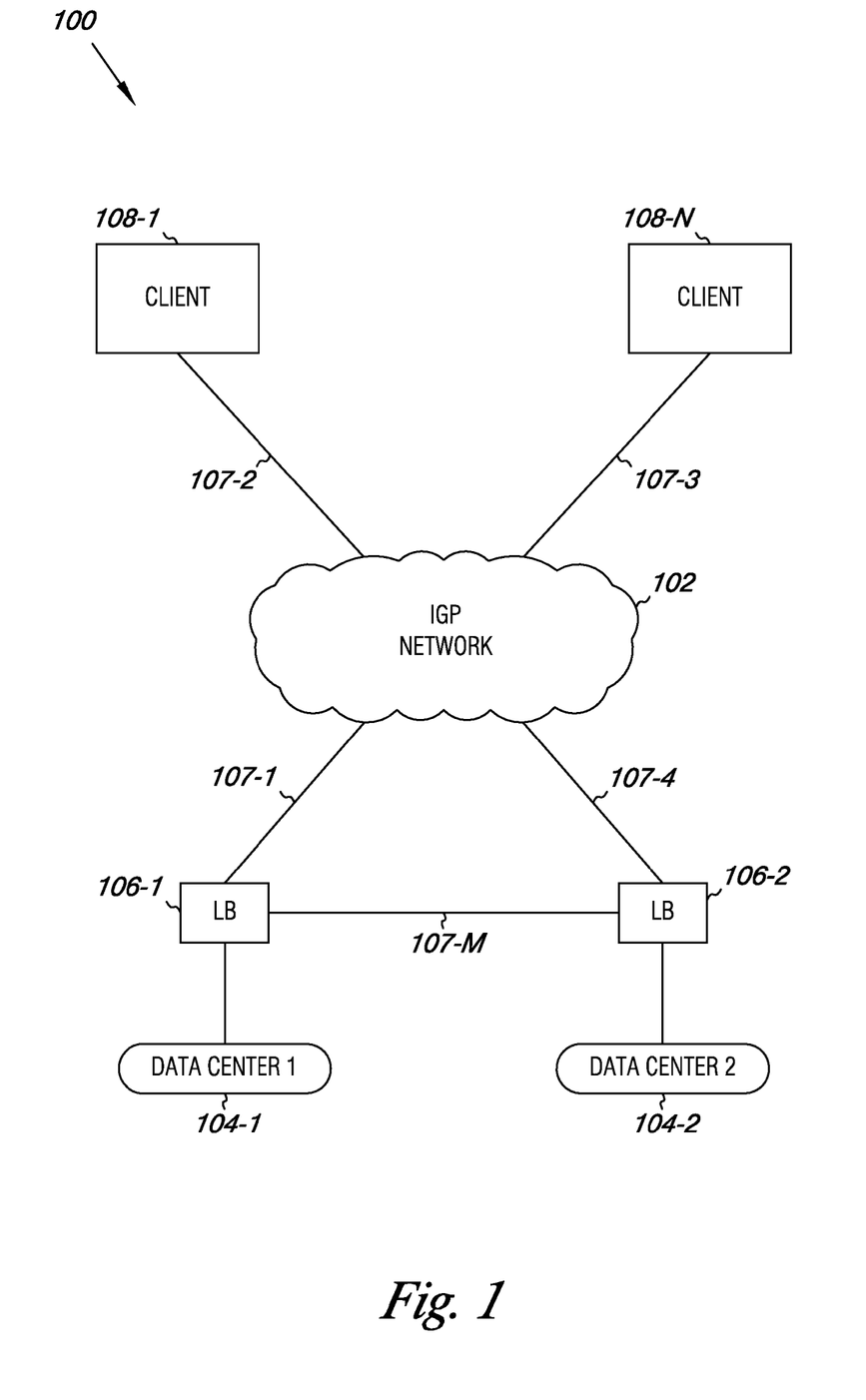
FIG. 1 illustrates a high level block diagram of an autonomous intranet system according to one or more embodiments of the present disclosure.

FIG. 1 illustrates a high level block diagram of an autonomous intranet system 100 according to one or more embodiments of the present disclosure. An autonomous intranet is a network or collection of networks under the control of a single organization, e.g., the organization can have a common routing policy for the autonomous intranet. The autonomous intranet system 100 includes an interior gateway protocol (IGP) network cloud 102 indicating a number of network interconnections, e.g., routers. Two data centers 104-1 and 104-2 are illustrated, each connected to a load balancer 106-1 and 106-2 respectively. Furthermore, the load balancers 106-1 and 106-2 are illustrated with an interconnection to each other and an interconnection to the IGP network cloud 102. Two clients 108-1 and 108-N are illustrated interconnected to the IGP network cloud 102. The designator "N" indicates that a number of clients may be interconnected with the IGP network cloud 102.

The interconnection 107-M between load balancers 106-1 and 106-2 can be a secure high-bandwidth link, e.g. a private T3 line. The interconnection between load balancers can provide a direct communication link between load balancers associated with data centers, e.g., data centers 104-1 and 104-2. Embodiments are not limited to autonomous intranet systems having a direct interconnection between load balancers. Load balancers can share information via a routed network path, e.g., through IGP network 102.

Each of the interconnections 107-1, 107-2, 107-3, 107-4, and 107-M illustrated in FIG. 1 represents an IGP link, as the embodiment illustrated in FIG. 1 is an autonomous intranet system. The designator "M" is used to indicate that a number of interconnections can be included with the autonomous intranet system 100. That is, one organization, e.g., one company, can exercise topographic control over the network. Although the autonomous intranet system 100 can be connected, e.g., via border gateway protocol (BGP) to the Internet, such a connection is not illustrated herein so as not to obfuscate various embodiments of the present disclosure. As such, clients, e.g., client 108-1, connect to the IGP network 102 via an intranet connection. Clients, such as clients 108-1, can be computing devices connected to the IGP network 102, e.g., a computing device operated by an employee of the organization exercising topographic control over the autonomous intranet system 100. Embodiments are not limited to employee-clients; other client-types are possible.

Data centers, e.g., data center 104-1 can include a number of server farms including various servers, such as web servers, application servers, file servers, email servers, print servers, database servers, etc. A server farm can include multiple servers facilitating one or more common and/or different functions. For example, an email server farm could include multiple servers cooperatively providing access to email for an organization operating and/or leasing the server farm. A server farm can include servers providing functions different from one another, e.g., application servers, email servers, web servers, etc. An organization operating two data centers, e.g. data centers 104-1 and 104-2, can use one data center, e.g., data center 104-2 as a failover in case the other data center, e.g., data center 104-1 loses some or all of its functionality. That is, a second data center can include a number of counterpart server farms and/or counterpart servers that may be functionally equivalent to the number of server farms and/or servers associated with a first data center.

Load balancers can balance network traffic, e.g., from a number of clients, both within a particular data center, e.g., data center 104-1, and between a number of data centers, e.g., data centers 104-1 and 104-2. As will be described in more detail below, load balancers can receive health check information from a number of servers in a data center. In one or more embodiments, a load balancer can perform a health check on a number of servers to determine whether the servers are functional, e.g., whether traffic should continue to be routed to the servers. Such information can be used by a load balancer to initiate a failover between data centers, as described in more detail below.

In one or more embodiments, various components of the autonomous system 200 can include logic, a microprocessor, a micro-controller, an application specific integrated circuit, or the like. The processor may be interfaced with a memory configured to provide storage of a set of computer readable instructions in the form of software, firmware, and/or hardware that provides functionality. The interfaced memory may be implemented as a combination of volatile and non-volatile memory, such as dynamic random access memory ("DRAM"), EEPROM, flash memory, or the like.

Figure 2:
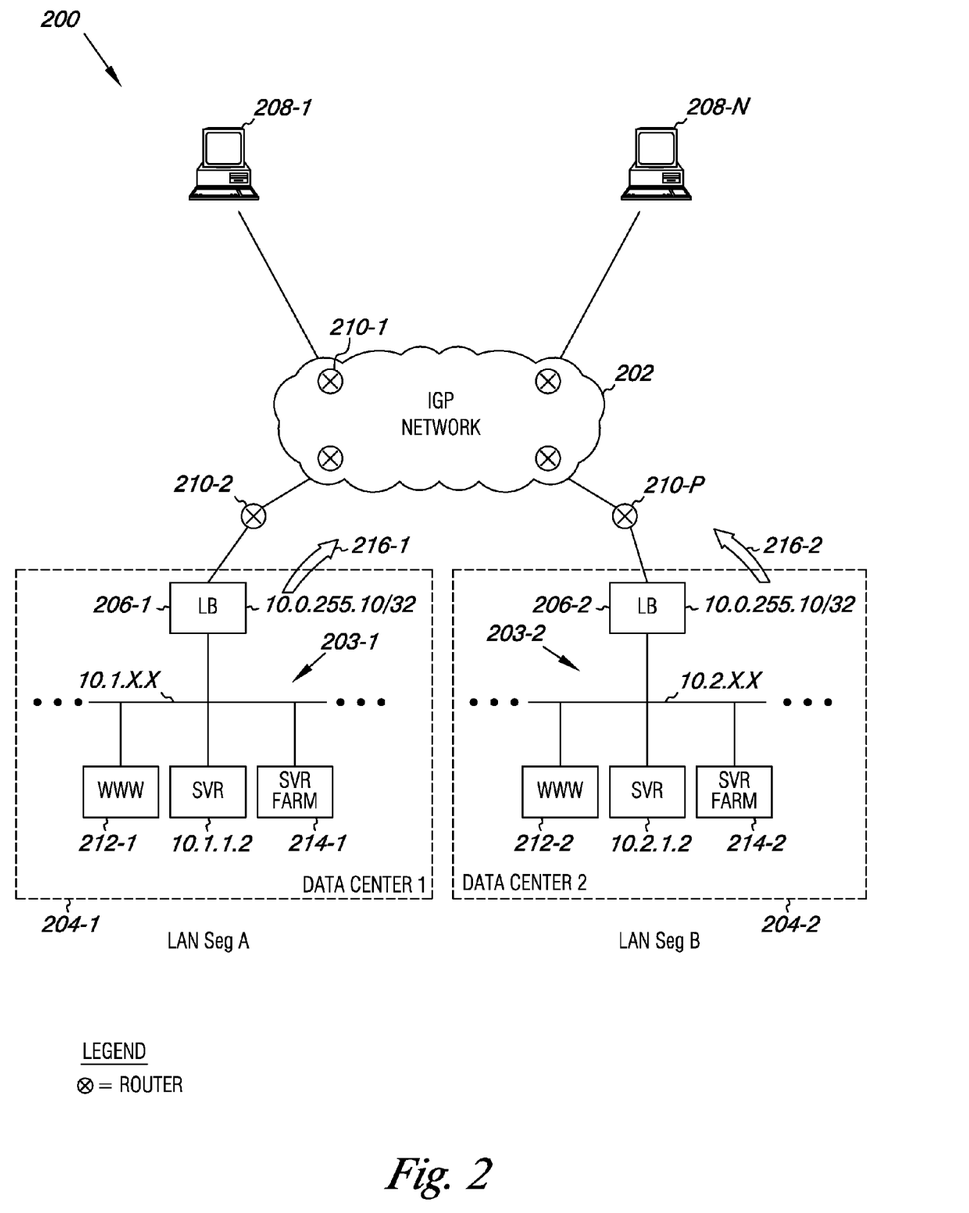
FIG. 2 illustrates a bock diagram of an autonomous intranet system having two active data centers according to one or more embodiments of the present disclosure.

FIG. 2 illustrates a block diagram of an autonomous intranet system 200 having two active data centers 204-1 and 204-2 according to one or more embodiments of the present disclosure. As used herein, an active data center is a data center that is advertising a network address upstream, e.g., having a load balancer that advertises a single-host IP address upstream. An active data center can handle, e.g., receive, process, and/or send, network traffic, e.g., packets.

The embodiment illustrated in FIG. 2 includes a first data center 204-1 and a second data center 204-2 on different LAN segments A and B respectively. There are no geographic restrictions on the distances of network connections illustrated in FIG. 2, e.g., data center one 204-1 could be a distance away from data center two 204-2. The data centers can include load balancers 206-1 and 206-2, each advertising, 216-1 and 216-2 respectively, a common single-host IP address, e.g., 10.0.255.10/32, upstream to the IGP network cloud 202. Each bit of the single-host IP address can be part of the network address. Because the IP address is a single-host address, it is not advertised on a subnet basis. That is, because each bit of the single-host address can be used as the network address, there are insufficient bits reserved to be used for subnetting. The single-host IP address can be used to connect to devices in a data center where each device in a data center can be part of a LAN segment. Although the example IP address illustrated in FIG. 2 may appear in Internet protocol version four (IPv4) form, embodiments are not so limited. Embodiments of the present disclosure can be practiced using Internet protocol version six (IPv6) and other network protocols.

Each load balancer can advertise the single-host IP address upstream for the data center, e.g., load balancer 206-1 can advertise 10.0.255.10/32 for data center 204-1 while load balancer 206-2 can advertise 10.0.255.10/32 for data center 204-2. In one or more embodiments, a load balancer, e.g., load balancer 206-1 can advertise the single-host IP address upstream through a router 210-2 interconnected with the load balancer 206-1. Although router 210-2 is illustrated outside of the data center 204-1, in one or more embodiments, the router 210-2 could be within the data center 204-1.

A number of routers, e.g., routers 210-1, 210-2, and 210-P, are illustrated to indicate that a number of routers may exist within the IGP network cloud 202, or elsewhere in the autonomous intranet system 200. The designator "P" is used to indicate that a number of routers may exist within the autonomous intranet system 200. Each link illustrated in FIG. 2 can be an IGP link, regardless of whether the link is within or to/from the TOP network cloud 202, e.g., traffic can be routed throughout the autonomous intranet system 200 using IGP. For example, traffic from client 208-1 could be routed to router 210-1, through the IGP network cloud 202, to router 210-2, and to data center 204-1, all using IGP. Thus, traffic from a client on the autonomous intranet system is routed to one of the data centers using IGP.

The embodiment illustrated in FIG. 2 represents two active data centers 204-1 and 204-2. Both data centers can advertise 216-1 and 216-2 the common single-host IP address. The single-host IP address can be advertised upstream using route health injection (RHI) to a number of routing tables of routers upstream, e.g., routers such as routers 210-1 and 210-2. Upstream routers, whether within IGP network cloud 202, such as router 210-1, or outside the cloud, such as router 210-2, can use a particular routing protocol, e.g., open shortest path first (OSPF), to select a network path for traffic between a client, e.g., client 208-1, and a data center, e.g., data center 204-1. In one or more embodiments, the network path selected by one or more routers for traffic from a client to a data center can be the topographically shortest route, e.g., the route which may provide the highest speed for traffic flow to/from the client, the fewest number of hops, and/or the lowest cost metric, depending on the particular routing configuration employed.

For a particular client session, traffic from a client, e.g., client 208-1, can be routed to one data center, e.g., data center 204-1. Although traffic levels can change during the particular client session, potentially altering the shortest network path between the client and data center, topographic control can be exercised over the autonomous intranet system such that actual persistence can be provided to the client, e.g., traffic from the client for the session may not be routed to more than one data center during the session. In contrast, non-autonomous networks connecting clients via the Internet may use BGP routing between more than one active data center and clients, reducing or eliminating the ability to use topographic control to provide session persistence for one or more clients, e.g., traffic from a particular client for a particular session may be routed to more than one data center in such instances.

The data centers 204-1 and 204-2 illustrated in FIG. 2 include load balancers 206-1 and 206-2 connected to a number of servers, e.g., web servers 212-1 and 212-2 and/or a number of server farms 214-1 and 214-2. As described above, a server farm can include a number of servers for performing a particular function. The number of servers and/or server farms illustrated herein does not limit the number or types of servers that may be used in a data center. For example, a data center could include multiple web servers, or a server farm including one or more web servers. The number of servers and/or server farms in data center 204-2 can provide redundant and/or backup functionality for the number of servers and/or server farms in data center 204-1, and vice versa, e.g., either data center can serve as a backup and/or redundant data center for the other data center. Data center 204-2 can provide the same or similar functionality as data center 204-1. Thus the number of servers and/or server farms in data center 204-2 can be counterparts to the number of servers and/or server farms in data center 204-1, e.g., web sever 212-2 in data center 204-2 can be a counterpart web server to web server 212-1 in data center 204-1.

As noted above, traffic from a particular client for a session can be routed to one data center, e.g., data center 204-1. As such, traffic from the particular client for the session can be routed to one or more servers and/or server farms in one data center, e.g., either to a server and/or server farm, e.g., server farm 214-1, or to a counterpart server and/or counterpart server farm, such as sever farm 214-2.

The number of servers and/or server farms in data center 204-1 can be on a particular layer two network 203-1 that is different than the layer two network 203-2 for the number of servers and/or server farms in data center 204-2. Such a network design can help prevent broadcast storms, particularly as compared to a network design including servers and counterpart servers on the same layer two network. The number of servers and/or server farms in data center 204-1 can have different network addresses than corresponding counterpart servers and/or server farms in data center 204-2. For example, server "SVR" in data center 204-1 can be assigned a network address of 10.1.1.2, while counterpart sever "SVR" in data center 204-2 can be assigned a network address of 10.2.1.2.

Figure 3:
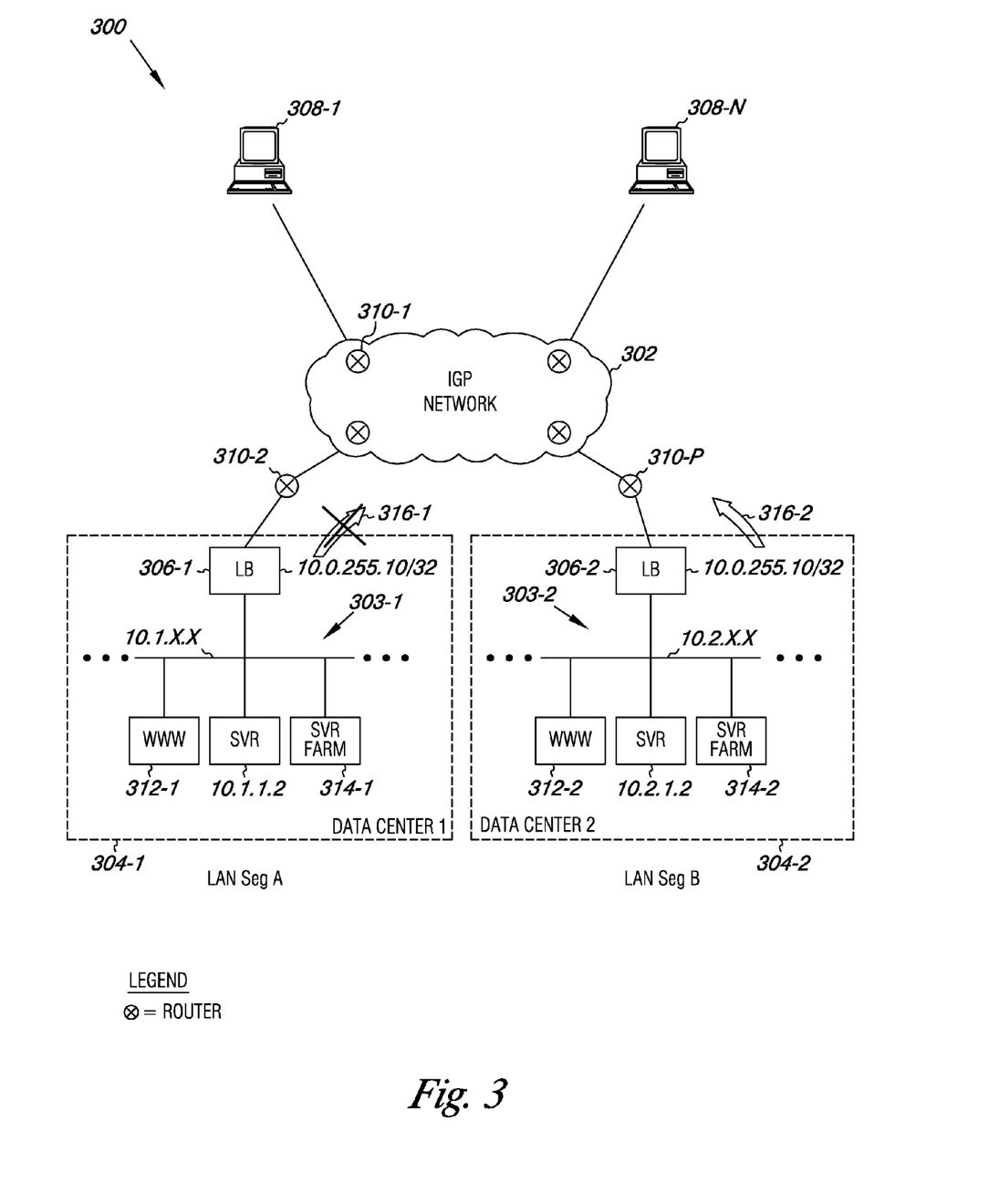
FIG. 3 illustrates a block diagram of an autonomous intranet system at failover according to one or more embodiments of the present disclosure.

FIG. 3 illustrates a block diagram of an autonomous intranet system 300 at failover according to one or more embodiments of the present disclosure. The autonomous intranet system 300 can include data centers 304-1 and 304-2, each including a load balancer 306-1 and 306-2 respectively. When both data centers 304-1 and 304-2 are active, both load balancers 306-1 and 306-2 can advertise 316-1 and 316-2 a single-host IP address, e.g., 10.0.255.10/32, upstream for the respective data centers. In such instances, traffic can be routed according to a particular convention or protocol, e.g., OSPF. However, during a failover from data center one 304-1 to data center two 304-2, data center one 304-1 can cease to advertise 316-1 the single-host IP address, as indicated in FIG. 3 by the X mark through advertisement 316-1.

A load balancer, such as load balancer 306-1 can be configured to perform a health check on a number of servers in the data center associated with the load balancer, e.g., "WWW" server 312-1 and/or server farm 314-1 in data center 304-1. The load balancer can advertise the single-host IP address upstream for the data center when the number of servers pass the health check, e.g., when the results of the health check meet certain criteria. However, when the results of the health check fail to meet certain criteria, the load balancer can cease to advertise the single-host IP address, e.g., initiate a failover, for a particular data center. Certain criteria can include failure of all or a portion of the servers and various degrees of failure, among other criteria as will be understood by one of ordinary skill in the art. In such instances, upstream routers, e.g., router 310-2, can cease to route traffic to the particular data center. For example, if the "SVR" with a network address of 10.1.1.2 in data center 304-1 failed to meet certain criteria in a health check, the load balancer 306-1 could cease advertising the single-host IP address upstream. In such an instance, load balancer 306-2 would, however, continue to be advertising the single-host IP address for data center 304-2. Thus, routers within the autonomous system 300, including routers in IGP network cloud 302, could route traffic intended for the IP address 10.0.255.10/32, which previously would have gone to data center 304-1, to data center 304-2.

As described above, autonomous system 300 can include a number of clients, e.g., clients 308-1 and 308-N, connected to the IGP network cloud 302. The designator "N" is used to indicate that a number of clients may be connected to the network cloud 302. Network cloud 302 can include a number of routers, e.g., router 310-1. Traffic from clients can be routed to a topographically closest data center, e.g., according to OSPF protocol. In one or more embodiments traffic from a number of clients may be balanced between more than one data center. For example, traffic from a number of clients can be balanced between data centers 304-1 and 304-2 using load balancers 306-1 and 306-2 according to a round-robin approach or other suitable techniques. Data centers 304-1 and 304-2 can be interconnected through a number of routers, e.g., router 310-2, and through the IGP network cloud 302. In one or more embodiments, data centers 304-1 and 304-2 may be connected via a direct dedicated line, e.g., a T3 fiber line. Accordingly, upon failover, e.g., when load balancer 306-1 ceases to advertise 316-1 the single-host IP address, traffic from a particular client, e.g., client 308-1, that had previously been routed to a first data center 304-1 can be routed to a second data center 304-2.

Likewise, the second load balancer 306-2 can perform a health check on a number of servers in the second data center 304-2. The second data center 304-2 can include a number of counterpart servers to the servers in the first data center 304-1 that can provide similar functionality. For example, "WWW" server 312-2 in the second data center 304-2 can be a counterpart web server to "WWW" server 312-1 in the first data center 304-1. When the results of the health check by load balancer 306-2 fail to meet certain criteria, the second load balancer 306-2 can cease to advertise 316-2 the single-host IP address upstream for the second data center 304-2. In such instances, traffic can be routed to the first data center 304-1, if it has not already initiated a failover, e.g., if the first load balancer 304-1 is advertising the single-host IP address upstream. Accordingly, traffic from a particular client, e.g., client 308-1 that was routed to the second data center 304-2, can be routed to the first data center 304-1 when the second load balancer ceases to advertise the single-host IP address.

In one or more embodiments of the present disclosure, a manual failover may be initiated, e.g., from data center 304-1 to 304-2. For example, operators of autonomous system 300 may desire to take various servers in data center 304-1, e.g., "WWW" server 312-1, offline for maintenance. In such an instance, load balancer 306-1 can discontinue advertising 316-1 the single-host IP address upstream for the first data center 304-1. Accordingly, traffic from clients beginning a new session can be routed through the IGP network cloud 302 to the second data center 304-2. However, in such instances, operators of the autonomous system 300 may wish to allow currently active client sessions having traffic routed to the first data center 304-1, to complete. Accordingly, topographic control may be exerted over the autonomous system 300 such that existing client sessions continue to be routed to the first data center 304-1, while new client sessions are routed to the second data center 304-2.

According to some previous approaches, failover, e.g., for a web server such as server 312-1, could occur from a server having one IP address to a server having a different IP address. Such a failover could require a client, who may have domain name system (DNS) information cached for the website to refresh a DNS record before that client was able to reconnect after failover. However, according to one or more embodiments of the present disclosure, traffic from a client, e.g., client 308-1, can be routed to the second data center 304-2 transparently to the client and without refreshing DNS records. For example, the client may not receive an error message after a failover, e.g., when the first load balancer 306-1 ceases to advertise the single-host IP address after the results of a health check fail to meet certain criteria, because the second load balancer can advertise the same single-host IP address for the second data center 304-2. Thus, traffic can be rerouted without refreshing DNS records, e.g., as may be stored in cache, for a client.

Figure 4:
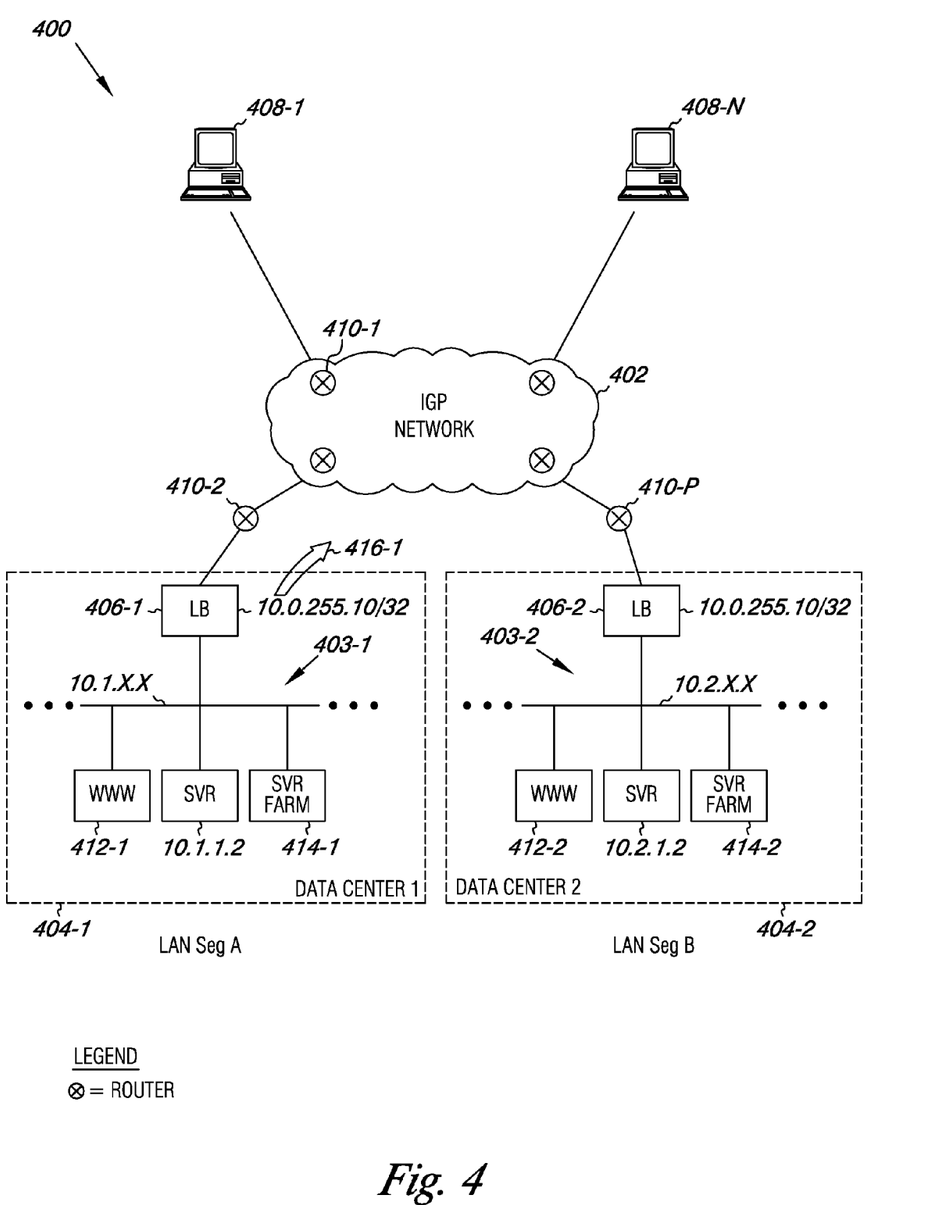
FIG. 4 illustrates a block diagram of an autonomous intranet system having one active data center according to one or more embodiments of the present disclosure.

FIG. 4 illustrates a block diagram of an autonomous intranet system 400 having one active data center 404-1 according to one or more embodiments of the present disclosure. In the embodiment illustrated in FIG. 4, the first data center 404-1 can include a first load balancer 406-1 that is advertising 416-1 a single-host IP address upstream to the autonomous intranet system 400 including a number of routers, e.g., router 410-2, and routers in the IGP network cloud 402, e.g., router 410-1. The first load balancer 406-1 can advertise the single-host IP address, e.g., 10.0.255.10/32 to the second load balancer 406-2, e.g., through IGP network cloud 402 or through a direct interconnection, e.g., as illustrated in FIG. 1. Thus, the first data center 404-1 can be said to be "active." The second data center 404-2 can include a second load balancer 406-2 that is not advertising the single-host IP address upstream. Thus, the second data center 404-2 can be said to be "passive."

In one or more embodiments of the present disclosure, the first load balancer 406-1 can advertise 416-1 the single-host IP address upstream based on received health check information from a number of servers in the first data center 404-1, e.g., "WWW" server 412-1, or server farms 414-1. For example, if information received from the number of servers indicates that the results of a health check fail to meet certain criteria, e.g., one or more servers are not functioning properly, then the first load balancer 406-1 can cease to advertise the single-host IP address, e.g., analogous to the "X" over advertisement 316-1 in FIG. 3. In such an instance, the second load balancer 406-2 can cease to receive the advertised single-host IP address from the first load balancer 406-1 and can begin advertising the single-host IP address upstream for the second data center 404-2, e.g., analogous to advertisement 216-2 in FIG. 2. Thus, active data center 404-1 can failover to passive data center 404-2. Accordingly, traffic from a client, e.g., client 408-1, that was being routed to the first data center can be routed to the second data center when the second load balancer advertises the single-host IP address upstream.

In one or more embodiments, advertising the single-host IP address upstream can include injecting a route to routing tables in one or more routers 410-1, 410-2, . . . , 410-P in the autonomous intranet system 400. For example, route health injection (RHI) may be used to advertise routes upstream. RHI can include performing a health check on a number of servers, e.g. performing a health check with load balancer 406-1 on servers in data center 404-1, and advertising the single-host IP address when the servers meet certain criteria of a particular health check. When one or more servers fail to meet certain criteria of a particular health check, the load balancer can cease to advertise the single-host IP address, as described above. Accordingly, upstream routers can be made "aware" that the route is no longer valid. When a second data center, e.g., data center 404-2 is advertising (or begins advertising) the single-host IP address, upstream routers can route traffic to that data center.

Embodiments of the present disclosure that include virtual private networks (VPNs) can include the use of reverse route injection (RRI) to inject a route into a number of routing tables upstream from a load balancer, e.g., load balancer 406-1. For example, client 408-1 can have a secure tunnel connection between router 410-1 and router 410-2 as VPN endpoints for data center 404-1 via load balancer 406-1. If the first load balancer 406-1 ceases to advertise the single-host IP address and the second load balancer 406-2 begins advertising, using RRI, a new secure tunnel can be created for client 408-1, e.g., to router 410-P as a VPN endpoint. Accordingly, data center failover can be achieved while providing continuous service to a client such that the failover is transparent to the client.

Unlike some prior networks using BGP routing, the present disclosure can provide, at least, an ability to provide data center failover without generating an error message to clients on the network. For example, using BGP routing, a routing table on a client's gateway router may not be updated until the "removed" route ages out and the router accepts another path to the IP address. Conversely, using IGP routing, e.g., with the autonomous intranet system 400, routing tables for routers through the autonomous system can be updated quickly, e.g., using link-state advertisements, such as OSPF routing protocol. A link-state advertisement can transport a routing topology to other routers in an OSPF area, e.g., autonomous system 400. Link-state advertisements can allow nodes in the autonomous system to receive a copy of other node's link-states to create a routing table for the autonomous system.

The first data center 404-1 can include a number of servers 412-1 and/or server farms 414-1 as described above. The second data center 404-2 can include a number of counterpart servers, e.g., "WWW" server 412-2, and/or server farms 414-2 as described above. The number of servers in the first data center 404-1 can be on a different LAN segment of the autonomous intranet system 400 and can have a different network address than the number of counterpart servers in the second data center 404-2. However, each of the number of servers in the first data center 404-1 can have a common subnet address and virtual host address with a corresponding counterpart server in the second data center 404-2, which can help simplify network address translation for traffic intended for a particular resource, e.g., a server or counterpart server, among other benefits.

The present disclosure provides a system and method for an autonomous intranet. The autonomous intranet can include two or more data centers, each provided with a load balancer for advertising a common single-host Internet Protocol address upstream for the respective data centers under certain conditions.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An autonomous intranet system, comprising:
a first data center including a first load balancer that advertises a single-host Internet Protocol (IP) address upstream for the first data center using route health injection (RHI);
a second data center including a second load balancer that advertises the single-host IP address upstream for the second data center using RHI;
wherein traffic from a number of client sessions is routed to one of the first and second data centers using interior gateway protocol (IGP);
wherein the first load balancer performs a first health check and ceases to advertise the single host IP address for the first data center when results of the first health check fail to meet one or more criteria;
wherein traffic from at least one of the number of client sessions that was routed to the first data center is routed to the second data center when the first load balancer ceases to advertise the single-host IP address; and
wherein at least one of the number of client sessions is active, and traffic from the at least one active session is routed to the first data center when the first load balancer ceases to advertise the single-host IP address.

2. The autonomous intranet system of claim 1, wherein traffic from the number of client sessions is routed to one of the first and second data centers using open shortest path first (OSPF) protocol.

3. The autonomous intranet system of claim 1, wherein:
the first data center includes a number of server farms;
the second data center includes a number of counterpart server farms functionally equivalent to the number of server farms; and
wherein traffic from the number of client sessions is routed to one or more servers in one selected from the number of server farms and the number of counterpart server farms.

4. The autonomous intranet system of claim 3, wherein servers in the number of server farms are on a different layer two network than counterpart servers in the number of counterpart server farms.

5. The autonomous intranet system of claim 3, wherein servers in the number of server farms have different network addresses than counterpart servers in the number of counterpart server farms.

6. The autonomous intranet system of claim 1, wherein the first and second load balancers balance traffic from the number of client sessions on the autonomous intranet system between the first and second data centers.

7. The autonomous intranet system of claim 1, wherein all traffic from the number of client sessions for a particular transaction is routed to one of the first and second data centers.

8. A method for operating an autonomous intranet system, comprising:
advertising a single-host Internet Protocol (IP) address upstream with a first load balancer for a first data center using route health injection (RHI);
advertising the single-host IP address upstream with a second load balancer for a second data center using RHI;
wherein traffic from a number of client sessions is routed to one of the first and second data centers using interior gateway protocol (IGP);
performing a first health check by the first load balancer and ceasing to advertise the single-host IP address upstream for the first data center when results of the first health check fail to meet one or more criteria;
routing traffic from at least one of the number of client sessions that was routed to the first data center to the second data center when the first load balancer ceases to advertise the single-host IP address; and routing traffic from at least one active client session within the number of client sessions to the first data center when the first load balancer ceases to advertise the single-host IP address.

9. The method of claim 8, wherein routing traffic from the number of client sessions includes using open shortest path first (OSPF) protocol.

10. The method of claim 8, wherein the method includes:
provinding the first data center with a number of server farms;
providing the second data center with a number of counterpart server farms functionally equivalent to the number of server farms; and
routing traffic from the number of client sessions to one or more servers in one selected from the number of server farms and the number of counterpart server farms.

11. The method of claim 10, wherein the method includes providing servers in the number of server farms on a different layer two network than counterpart servers in the number of counterpart server farms.

12. The method of claim 10, wherein the method includes providing servers in the number of server farms with a different network address than counterpart servers in the number of counterpart server farms.

13. The method of claim 8, wherein the method includes balancing traffic from the number of client sessions on the autonomous intranet system using the first and second load balancers between the first and second data centers.

14. The method of claim 8, wherein the routing traffic from the number of client sessions includes routing all traffic from the number of client sessions for a particular transaction to one of the first and second data centers.

15. A non-transitory computer readable medium having instructions stored thereon, which, when executed by a processor, cause a device to perform a method, comprising:
receiving a single-host Internet Protocol (IP) address advertised upstream from a first load balancer for a first data center using route health injection (MI);
receiving the single-host IP address advertised upstream from a second load balancer for a second data center using RHI;
wherein traffic from a number of client sessions is routed to one of the first and second data centers using interior gateway protocol (IGP);
performing a first health check by the first load balancer and ceasing to advertise the single-host IP address upstream for the first data center when results of the first health check fail to meet one or more criteria;
routing traffic from at least one of the number of client sessions that was routed to the first data center to the second data center when the first load balancer ceases to advertise the single-host IP address; and
routing traffic from at least one active client session within the number of client sessions to the first data center when the first load balancer ceases to advertise the single-host IP address.

16. The medium of claim 15, wherein routing traffic from the number of client sessions includes using open shortest path first (OSPF) protocol.

17. The medium of claim 15, wherein routing traffic from the number of client sessions includes routing traffic to one or more servers in one selected from:
a number of server farms in the first data center; and
a number of counterpart server farms in the second data center functionally equivalent to the number of server farms.

18. The medium of claim 17, wherein routing traffic from the client includes routing traffic to one or more servers in one selected from:
the number of servers in the first data center on a first layer two network; and
the number of counterpart servers in the second data center on a second layer two network.

19. The medium of claim 17, wherein routing traffic from the number of client sessions includes routing traffic to a server in one selected from:
the number of servers in the first data center having a first network address; and
the number of counterpart servers in the second data center having a second network address.

20. The medium of claim 15, wherein the method includes routing traffic from the number of client sessions on the autonomous intranet system based on information received from the first and second load balancers such that traffic is balanced between the first and second data centers.

21. The medium of claim 15, wherein routing traffic from the number of client sessions includes routing all traffic from the number of client sessions for a particular transaction to one of the first and second data centers.

* * * * *